J. T. SIMPSON.
FLYING MACHINE.
APPLICATION FILED AUG. 23, 1916.
1,230,526.
Patented June 19, 1917.
5 SHEETS—SHEET 1.
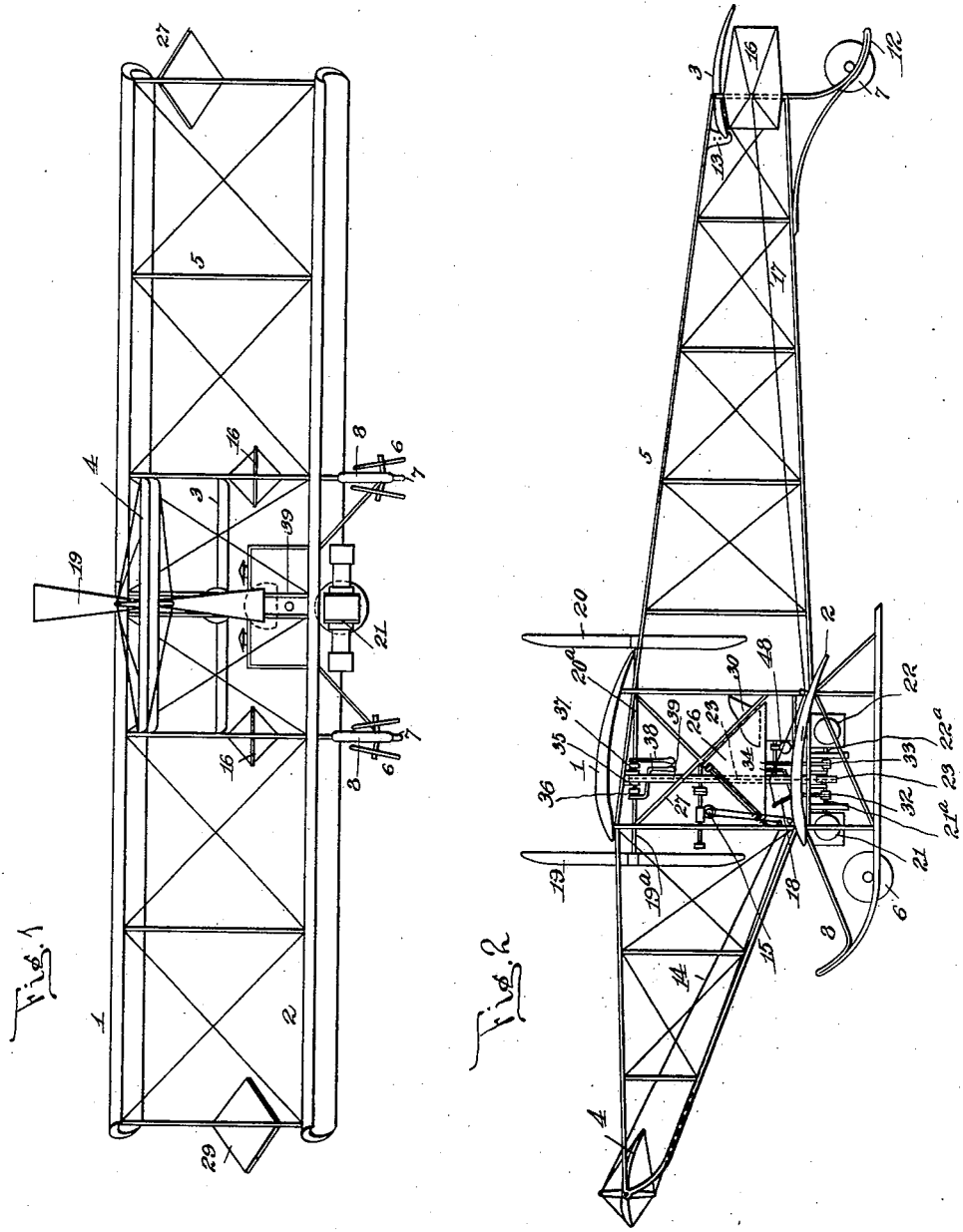
Witnesses:
Inventor
John Thomas Simpson
By Dyer & Taylor
Attorneys.

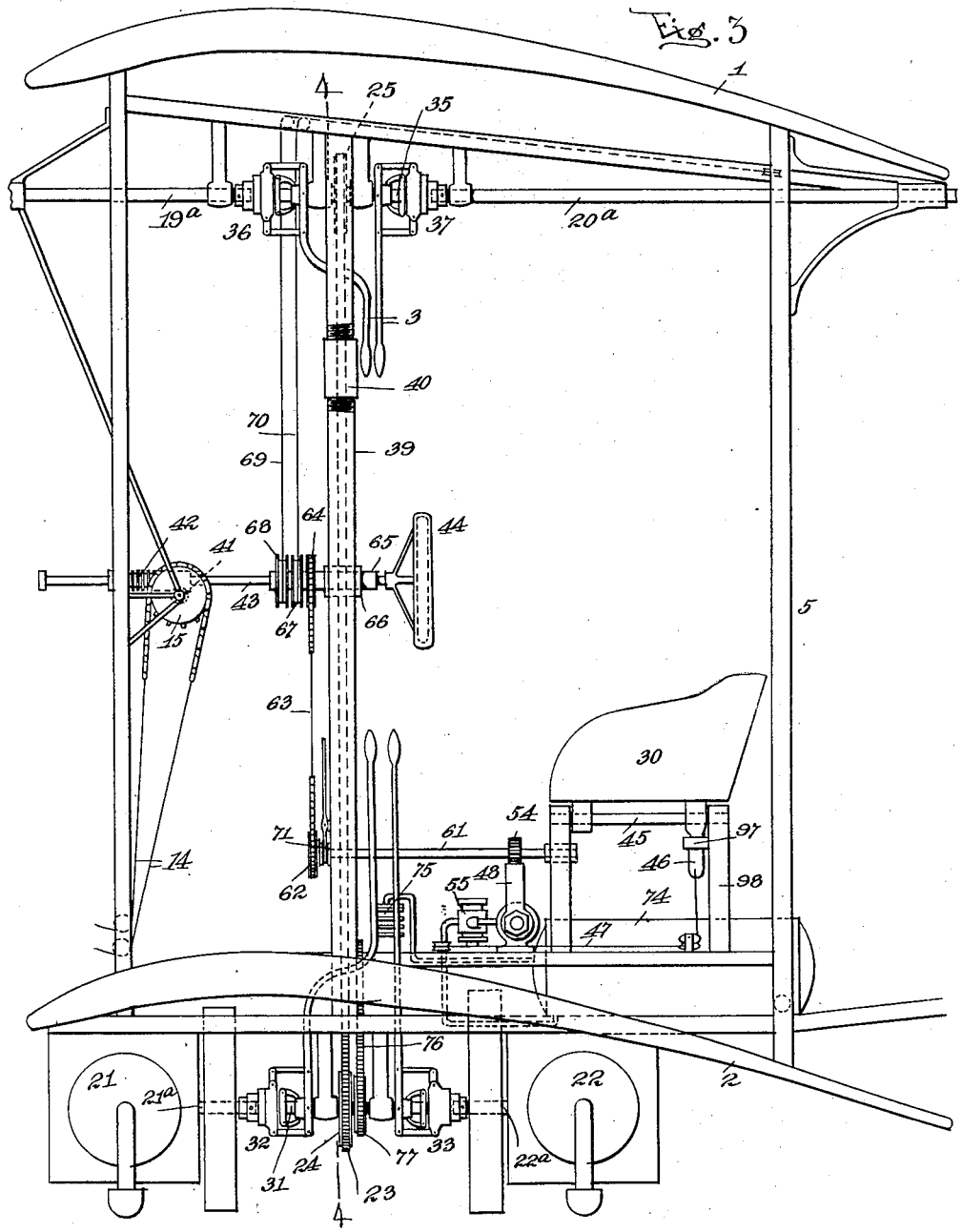

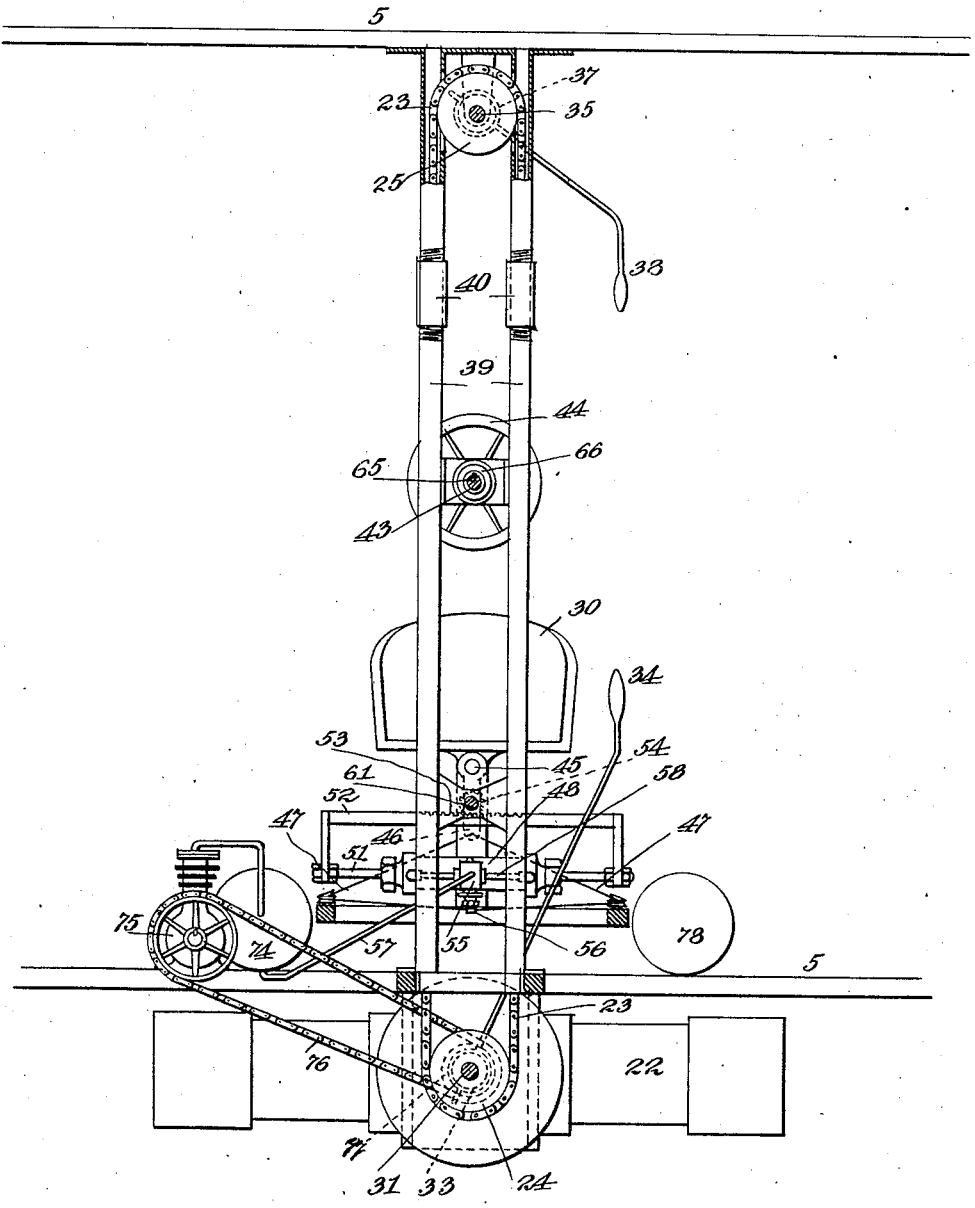

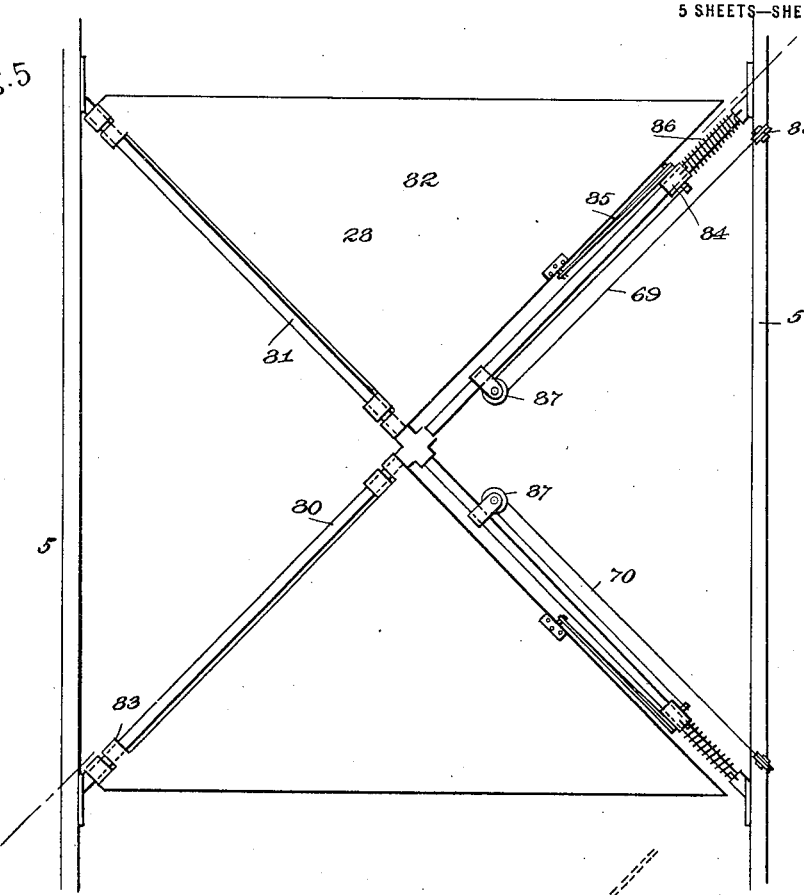
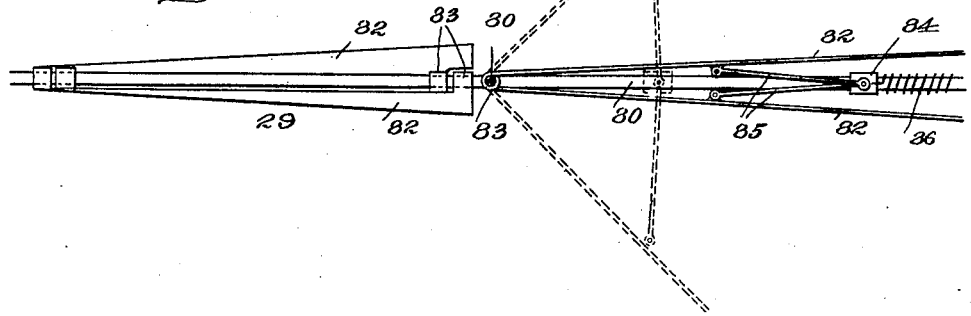

J. T. SIMPSON.
FLYING MACHINE.
APPLICATION FILED AUG. 23, 1916.

1,230,526.

Patented June 19, 1917.
5 SHEETS—SHEET 5.

Witnesses:
ee Strong
J. G. McDermott

Inventor
John Thomas Simpson
By Dyer Taylor
Attorneys.

UNITED STATES PATENT OFFICE.

JOHN THOMAS SIMPSON, OF NEWARK, NEW JERSEY.

FLYING-MACHINE.

1,230,526.  Specification of Letters Patent.  Patented June 19, 1917.

Original application filed July 12, 1910, Serial No. 571,557. Divided and this application filed August 23, 1916. Serial No. 116,519.

*To all whom it may concern:*

Be it known that I, JOHN T. SIMPSON, a citizen of the United States, and residing in Newark, in the county of Essex and State of New Jersey, have invented a certain new and useful Flying-Machine, of which the following is a specification.

This application is a division of an application for patent filed by me on July 12, 1910, Serial Number 571,557.

The object I have in view is the production of an aeroplane or heavier-than-air flying machine, which will have advantages in stabilizing and balancing. Further objects are to produce means to stabilize without the use of the steering rudder, also to stabilize by powerful and certain mechanism independent of the strength of the operator.

These and further objects will appear from the following specification and accompanying drawings considered together or separately.

In the drawings,

Figure 1 is the front elevation of an apparatus embodying my invention.

Fig. 2 is a side elevation of the same showing it in the position it assumes when in flight.

Fig. 3 is a side elevation on an enlarged scale of the centrally located operating and controlling mechanism.

Fig. 4 is a section on the line 4—4 of Fig. 3.

Fig. 5 is an elevation, on the same scale as the preceding two figures, of a pair of ailerons.

Fig. 6 is a sectional view on the line 6—6 of Fig. 5 showing one aileron in open position in broken lines.

In all of the views like parts are designated by the same reference characters.

Figure 7:
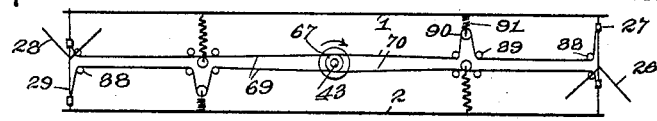
Fig. 7 is a diagrammatic view of the preferred form of connections to the stabilizing ailerons showing the latter in one position.

Certain of my improvements may be used upon an aeroplane of the bi-plane type, and the embodiment chosen for illustration is of this character. I desire to have it understood that the number of planes of the machine is unimportant and that the invention can be carried out with any form of aeroplane.

In the drawings, 1 is the top plane, 2 is the bottom plane, such planes being superposed in the usual manner. 3 is the rear plane for controlling altitude and 4 is the front plane for the same purpose. 5 is the frame. This frame is made of verticals and longitudinals as shown, with diagonal filamentous tension members to secure rigidity. This frame is lightly and rigidly formed. The frame is supported upon front wheels 6 and rear wheels 7, there being four sets of such wheels illustrated. The front wheels are supported upon a sled like arrangement 8 forming skids, there being two of such arrangements in the front. The rear plane 3 is adjustable for different angles of incidence to be determined by trial flights. Adjusting means are shown at 13. This adjusting means for holding the plane at the proper angle of incidence comprises a pillar with a number of openings as illustrated, for the attachment of a pin on the forward edge of the plane, the plane being secured to a horizontal pivot at a point intermediate its ends. The rudders 16, are mounted upon vertical axes and are controlled by wires 17.

In the preferred embodiment of my invention I employ a front propeller 19 and a rear propeller 20, said propellers being mounted upon suitable shafts 19$^a$ and 20$^a$ in alinement. I also prefer to utilize a forward engine 21 and a rearward engine 22, having shafts 21$^a$ and 22$^a$ in alinement. The engines illustrated are of the horizontal, two cylinder, double opposed internal combustion type. The kind of engine may be varied if desired. The shafts of the engines are connected to the shafts of the propellers through suitable sprockets and a chain 23, the sprocket on the line with the engines being indicated by the character 24, and the sprocket on the line with the propellers being indicated by the character 25. The engines, as shown are below the bottom of the frame so as to make the center of gravity as low as possible and also to allow the operator to be above the engine for safety, while the propellers are arranged adjacent to the top of the frame.

The ailerons 26, 27, 28, and 29 are mounted adjacent to the wing tips and are connected to suitable stabilizing mechanism, which will be described. The operator's seat 30 is mounted on the frame within convenient distance of the pedals and the engine.

Figure 9:
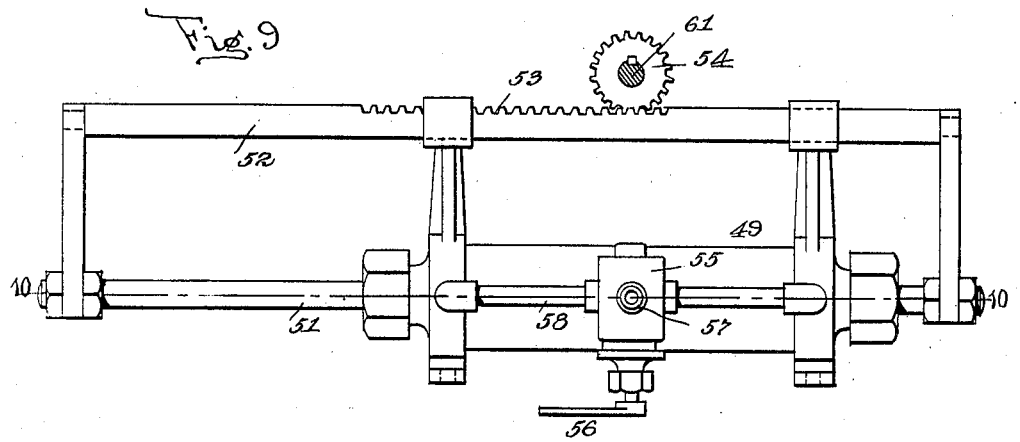
Fig. 9 is a side elevation of the mechanical stabilizing motor.

The stabilizing device includes means for operating the ailerons 26, 27, 28, and 29 and consists of mechanism governed or controlled by the position of the seat. The governing mechanism, which may be said to be quasi-automatic, includes a device controlled by the position of the operator and seat, and includes an engine operated by compressed air, which is furnished by the propelling mechanism. The details of the quasi-automatic mechanism are as follows: The seat is so mounted upon its support that it will be swung from side to side by the instinctive movements of the operator, resulting from inclinations of the machine. The support for the seat is by means of a shaft 45, the seat having a depending arm 46. Suitable stops 97 on the standard 98 are provided to limit the extent of movement of the seat. To this arm are connected wires 47, which in turn are connected to the controller of the air engine 48 (see Figs. 9 and 10). This air engine is composed of a cylinder 49 with stuffing boxes at the ends, as shown, a piston 50 traversing the cylinder and a piston rod 51 connected to the piston and passing through the stuffing boxes. The ends of this rod are connected to a frame 52 which slides in bearings on the cylinder, as shown, and is provided with a rack 53 which engages with a pinion 54. The controlling mechanism for the air engine comprises a valve 55, controlled by an arm 56. To this arm the wires 47 connect and serve to move it from right to left or vice versa. This valve is of the four port type, the air entering through the pipe 57 and passing through the side pipes 58—58 to one or the other side of the piston 50, as depends upon the position of the valve. The exhaust or outlet 59 is opposite the inlet pipe 57. The ports 60 in the valve are shown as narrower than the pipes 58—58, for the purpose of allowing a certain amount of lost motion; in other words, when the arm 56 is in the vertical position, in the embodiment illustrated, the ports will be closed and will not be opened until the arm has partaken of considerable movement one way or the other. When they are opened they will be suddenly opened, consequently the engine will not operate until the seat has been tilted to some extent. When it does operate it will be operated with full power, caused by a very slight further movement of the seat. By this structure sudden fluctuations of the engine will not be caused by trivial movements of the seat.

Turning now to Figs. 3 and 4, it is seen that the pinion 54 is mounted upon a shaft 61 mounted in suitable bearings, the forward end of the shaft carrying a sprocket 62 having a length of chain intermeshed with its teeth which, through the wires 63, and a short length of chain will connect with a sprocket 64 mounted upon the shaft 43. This sprocket is carried upon a sleeve 65 (see Fig. 3) such sleeve being connected to the shaft 43 by a feather or other device to cause the two to rotate together and at the same time to permit the shaft to be moved longitudinally. This sleeve is mounted in a bearing 66 so that its longitudinal position is fixed. The sleeve 65 carries drums 67 and 68 over which are wound wires 69 and 70 respectively, these wires connect to the ailerons 26, 27, 28, and 29 in a manner which will be described, so that when the shaft is rotated in one direction the upper aileron on one wing tip and the lower aileron on the opposite wing tip will be opened and when rotated in the opposite direction the other two ailerons will be similarly affected.

From this description it will be apparent that as the seat is oscillated upon its bearings by the involuntary movement of the operator the air engine 48 will be similarly actuated and through the wires 63 the shaft 43 will be turned. This will produce a semi-automatic stabilizing of the apparatus. The stand-by control will be in the wheel 44.

In order to avoid the drag of the air engine when the stand-by apparatus is in action, I provide a clutch 71 on the shaft 61 to disconnect the sprocket 62.

The air supply is contained within a tank 74, pressure being supplied by the compressor 75, which is actuated by a chain 76, from a sprocket 77. This compressor may be provided with disconnecting mechanism not shown, and the tank 74 may be provided with a relief valve not shown.

Figure 8:
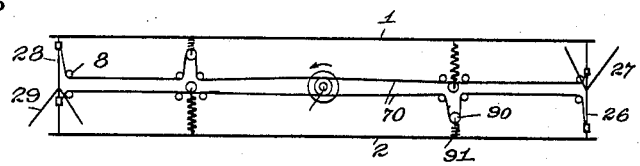
Fig. 8 is a similar position showing the ailerons in different position.
Figure 10:
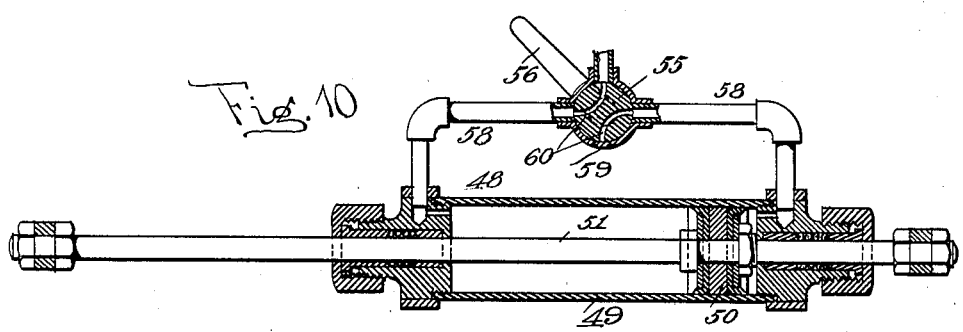
Fig. 10 is a sectional view thereof on the line 10—10 of Fig. 9.

The ailerons 26, 27, 28 and 29, are mounted as before stated, adjacent to the wing tips of the main planes 1 and 2. These ailerons are made as follows: Diagonal tubular struts 80 and 81 are provided, such struts crossing at the center and forming an X frame, their ends being connected to the frame 5—5. To the forward sections of these struts are pivoted the ailerons. Each aileron is made of two plates 82, which may be made of any material sufficiently light and rigid for the purpose, and are provided with bearings or hinges 83, on the forward parts of the struts 80 and 81. These plates are adapted to be turned upon their hinges so they may lie in a generally fore and aft position as shown in solid lines (see Fig. 6) or they may be turned upon their hinges and opened, as shown in dotted lines Fig. 6, the apparatus being analogous to the opening or closing of an umbrella. The opening and closing mechanism is identical for all of the ailerons. It comprises a sleeve 84 mounted to slide upon the rear halves of the struts 80 or 81 respectively, said sleeve being connected by toggles 85 to the plates. It is apparent that by moving the sleeve along the strut in one direction or the other, the aileron will be opened or closed. The pressure of the air will tend to close the aileron, but this pressure may be augmented by a spring 86. The sleeve is moved to open the aileron against the pressure of the air by suitable wires 69 and 70, such wires being connected to their respective sleeves. Each wire passes over a pulley 87 (see Fig. 5) so as to get the proper lead, and also over a pulley 88 on the frame 5, so as to lead to the drums 67 and 68. The arrangement of the wires is best illustrated in Figs. 10 and 11. It will be apparent that the upper lefthand aileron 28 is connected to the wire 69 and that the lower lefthand aileron 29 is connected to the same wire, and that the upper righthand aileron 27 is connected to the wire 70, and the lower corresponding right hand aileron 26 is connected to the same wire. At an intermediate point between the pulleys 88 and the drums 67 and 68 are mounted pairs of guide pulleys 89, such pulleys being relatively close together. Between each two pulleys of a pair is mounted a pulley or tackle block 90 through which the wire is threaded, and the tackle block 90 is connected to the frame 5 by a spring 91. These springs need not be very powerful as they are simply for the purpose of taking up the slack in the wire. It is apparent therefore that when the shaft 43 is rotated in one direction or the other by the mechanism already described, the upper aileron on one side and the lower aileron on the other will be opened, while the two other ailerons will remain closed. It is also apparent that when the shaft 43 is in neutral position all four ailerons will be closed. As an example of this operation, the working of the two ailerons 28 and 29 may be followed. The shaft 43 being rotated in the direction of the arrow shown in Fig. 7 the upper portion of the wire 69 will be tightened, opening the aileron 28. The aileron 29 being already closed the slack wire moved in that direction will be taken up by the pulley 90 and spring 91. At the same time that the aileron 28 is opening the aileron 26 will also be opening by the wire 70 acting in the same manner. When the shaft 43 is reversed the action shown in Fig. 8 will be followed, namely, the ailerons 27 and 29 will be opened, while the ailerons 26 and 28 remain closed. If desired each aileron may have but one plate, instead of two. The wires may be so proportioned as to length and position on their drums, that the aileron on one side may begin to open slightly in advance of that on the other, and remain in a slightly more open position, so that stabilizing may take place without sidewise deflection and consequent employment of the rudders 16—16.

In accordance with the provisions of the patent statutes I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. A flying machine having a supporting plane, a stabilizing plane, a seat for the operator, a power plant controlled on movement of the seat by the body of the operator, and means whereby the power plant will operate to move the stabilizing plane.

2. A flying machine having a supporting plane, a plurality of stabilizing planes, a seat for the operator, a power plant controlled on movement of the seat by the body of the operator, and means whereby the power plant will operate to move the stabilizing planes.

3. A flying machine having supporting planes, a seat for the operator, a stabilizing plane at each wing tip, a power plant operated on movement of the seat by the body of the operator, and means whereby the power plant will operate to simultaneously move the stabilizing plane on opposite wing tips.

4. A flying machine having supporting planes, a seat for the operator, oppositely arranged ailerons on opposite wing tips, a power plant controlled on movement of the seat by the body of the operator, and means whereby the power plant will operate to simultaneously move the ailerons.

5. A flying machine having supporting planes, a seat for the operator, oppositely arranged pivoted ailerons on opposite wing tips, a power plant controlled on movement of the seat by the body of the operator, and means whereby the power plant will operate to simultaneously move the ailerons.

6. A flying machine having supporting planes, a propeller, an engine for driving the propeller, a seat for the operator, ailerons at the extremities of the planes, an air engine, and connections with the seat whereby movement of the body of the operator will move the seat to govern the operation of the air engine to operate the ailerons.

7. A flying machine having stabilizing planes, an air engine, said engine comprising a cylinder, a double acting piston in the cylinder, a piston rod, a rack moved by the rod, a gear engaged by the rack, and connections between the gear and the planes for simultaneously operating planes on opposite sides of the machine.

8. A flying machine having supporting planes, a propeller, an engine for driving the propeller, stabilizing planes, an air engine for operating the stabilizing planes, means operated by the instinctive movements of the operator for controlling the air engine, a reservoir, an air compressor communicating with the reservoir, and connections between the first mentioned engine and the compressor for operating the latter.

This specification signed and witnessed this 19th day of August, 1916.

JOHN THOMAS SIMPSON.

Witnesses:
MARIE C. HARTUNG,
GEORGE ARNOLD WRIGHT.